(12) United States Patent
Happonen et al.

(10) Patent No.: US 6,895,044 B2
(45) Date of Patent: May 17, 2005

(54) METHOD FOR NOISE ENERGY ESTIMATION IN TDMA SYSTEMS

(75) Inventors: Aki Happonen, Kiiminki (FI); Olli Piirainen, Oulu (FI)

(73) Assignee: Nokia Corporation, Espoo (FI)

( * ) Notice: Subject to any disclaimer, the term of this patent is extended or adjusted under 35 U.S.C. 154(b) by 659 days.

(21) Appl. No.: 10/001,156

(22) Filed: Nov. 1, 2001

(65) Prior Publication Data

US 2002/0110199 A1 Aug. 15, 2002

Related U.S. Application Data

(63) Continuation of application No. PCT/EP99/03383, filed on May 17, 1999.

(51) Int. Cl.[7] .................................................. H03K 5/59
(52) U.S. Cl. ....................... 375/231; 375/232; 375/324; 375/340; 375/348; 375/350; 455/226.2; 455/226.3; 455/307; 370/252
(58) Field of Search .................... 375/227, 229–232, 375/284, 285, 324, 340, 346, 348, 350; 455/50.1, 52.1, 52.3, 63, 65, 67.3, 67.1, 226.1–226.4, 296, 307; 370/252, 321, 337, 347, 442, 465

(56) References Cited

U.S. PATENT DOCUMENTS

| | | | |
|---|---|---|---|
| 5,199,047 A | | 3/1993 | Koch |
| 5,559,723 A | * | 9/1996 | Mourot et al. ............... 375/229 |
| 6,243,415 B1 | * | 6/2001 | Pipon et al. ................. 375/232 |
| 6,631,160 B2 | * | 10/2003 | Piirainen et al. ............ 375/231 |

FOREIGN PATENT DOCUMENTS

| | | |
|---|---|---|
| EP | 0428199 B1 | 5/1991 |
| WO | WO 97/08841 | 3/1997 |
| WO | WO 97/41702 | 4/1997 |
| WO | 00/05847 | 7/1998 |

\* cited by examiner

*Primary Examiner*—Dac V. Ha
(74) *Attorney, Agent, or Firm*—Squire, Sanders & Dempsey LLP

(57) ABSTRACT

The present invention proposes a method for estimating a signal variance of a received signal (y) transmitted via a transmission channel, said method comprising the steps of: estimating the energy (RSSI) of the received signal (y), estimating the energy (Emax) of channel impulse response (h) taps, and estimating said signal variance (VAR) of said received signal by subtracting said estimated energy of channel impulse response taps (Emax) from said estimated energy (RSSI) of said received signal, such that said signal variance is obtained as VAR=RSSI−Emax. The present invention also proposes a correspondingly adapted device.

6 Claims, 2 Drawing Sheets

METHOD FOR NOISE ENERGY ESTIMATION IN TDMA SYSTEMS

This application is a continuation of international application serial number PCT/EP99/03383, filed 17 May 1999.

FIELD OF THE INVENTION

The present invention relates to a method and corresponding device for noise energy estimation and/or variance estimation of a signal transmitted via a transmission channel. Particularly, the present invention concerns such a method and device to be used in connection with a radio telecommunication system.

BACKGROUND OF THE INVENTION

Recently, mobile radio telecommunication systems have widely spread. Such mobile radio telecommunication systems operate for example according to a commonly agreed standard, like for example the GSM standard. According to GSM standard, data transmission is performed according to a method of time divisional multiple access (TDMA). The TDMA transmission principle specifies that data are transmitted from a transmitter to a receiver and vice versa only during respectively specified time slots of frames.

Data transmission in such telecommunication systems substantially relies on digital data transmission. However, between a mobile radio transceiver device as a subscriber terminal (hereinafter: mobile station MS) and a stationary radio transceiver device as a serving radio network element (hereinafter: base station BS) data have necessarily to be transmitted as analogue data via the air interface Um (representing the transmission channel of interest).

Consequently, data transmitted by the mobile station MS are received via a base station antenna means of a reception device of the base station BS as analogue data. In the course of the further processing of the thus received data by the reception device, the analogue data are analog to digital converted, i.e. passed through an A/D converter means. At the next stage of the processing, the obtained digital data are supplied to an equalizer means for being equalized. The thus obtained output data are then supplied to a channel codec means for coding/decoding the data. At the reception side, decoding is performed to separate received speech data from associated signaling data.

Particular attention in the course of this processing has to be paid to the equalizing of the received data, since the equalizing is required to reconstruct, at the reception side, the transmitted signal from a mixture of received signals.

For example, assuming a situation in a radio telecommunication network with a base station BS and only a single mobile station MS present in the radio coverage area of the base station. Then, a signal s transmitted from the mobile station MS may reach the base station BS directly via line of sight at a time $s(t)$. However, the same signal s may be deflected by, e.g., a building, a mountain or the like present in the environment. Thus, the same signal may reach the base station BS at a later point of time $s(t+T)$, and is thus superposed to the signal $s(t)$. Due to the delay T, both received signals are no longer in phase with each other. Moreover, the delayed signal $s(t+T)$ may even be more attenuated than the signal $s(t)$ due to the longer transmission path. Thus, the signal received by the base station BS and originating from the mobile station MS is distorted. Now, assuming that another mobile station MS' is additionally present, then signals $s'(t')$, $s'(t'+T')$ are additionally received by the base station BS, which may lead to interference between the respective transmitted data symbols (intersymbol interference).

Therefore, an equalizer means has to reconstruct (detect) the initially transmitted signal $s(t)$ and/or $s'(t')$ from the received mixture of signals $s(t)$, $s(t+T)$, $s'(t')$, $s'(t'+T')$.

The thus reconstructed (or detected) signal is required to be as similar to the originally transmitted signal as possible. This reconstruction is therefore a main concern when designing equalizers, e.g. for use in a reception device (receiver) of a base station BS.

As regards the adopted channel model in such a case, each of the above mentioned delayed signals forms a term of a respective FIR model of the channel impulse response function and represents a so-called tap. Based on the values of such taps, poles and zeroes of the transmission function can be calculated.

On a receiver side, it is necessary to have a knowledge of the quality of the received signal. This quality of the received signal is represented by the noise energy (variance) of the received signal. The knowledge of signal quality as represented by the noise energy is then used in a respective receiver (e.g. in connection with equalization).

In mobile communication systems, the noise energy of the received signal has to be estimated from the stream of received data.

According to previous solutions, the noise energy is calculated from the difference between the received signal on one hand and the result of a convolution processing of a training sequence (known to the receiver and also transmitted via the transmission channel and therefore contained in the received signal) and an estimated channel impulse response. An example thereof is described in document EP-B1-0 428 199.

However, performing a convolution processing requires a powerful digital signal processor device at the receiver side with a large data memory for intermediate storage of the convolution results. Moreover, due to the complexity of a convolution processing, such a processing is also rather time consuming.

Additionally, in receivers which are particularly adapted to receive and reconstruct transmitted speech data, noise energy is estimated based on the Viterbi algorithm. An example thereof is described in applicants former document WO 97/08841.

However, also an implementation of the Viterbi algorithm requires a powerful digital signal processor device at the receiver side with a large data memory for intermediate storage of the convolution results.

SUMMARY OF THE INVENTION

Consequently, it is an object of the present invention to provide a method and corresponding device for estimating a signal variance of a received signal transmitted via a transmission channel, which is free from the above discussed drawbacks inherent to the solutions according to known prior art.

According to the present invention, this object is achieved by a method for estimating a signal variance of a received signal transmitted via a transmission channel, said method comprising the steps of estimating the energy of the received signal, estimating the energy of channel impulse response taps, and estimating said signal variance of said received signal by subtracting said estimated energy of channel impulse response taps from said estimated energy of said received signal, such that said signal variance is obtained as VAR=RSSI−Emax.

Furthermore, according to the present invention, this object is achieved by a device for estimating a signal variance of a received signal transmitted via a transmission channel, said device comprising first estimation means adapted to estimate the energy of the received signal, second estimation means adapted to estimate the energy of channel impulse response taps, and third estimation means adapted to estimate said signal variance of said received signal and comprising a subtracting unit adapted for subtracting said estimated energy of channel impulse response taps from said estimated energy of said received signal, such that said signal variance is obtained as VAR=RSSI−Emax.

Favorable refinements of the present invention are as set out in the respective dependent claims.

Thus, the present invention advantageously provides a very simple method to estimate the noise energy, i.e. variance of a received signal. Particularly, the calculation is significantly simpler than a convolution based variance estimation.

Furthermore, the present invention can be beneficially used in the above mentioned receivers, where the data memory of used digital signal processor devices is limited, since it requires less data memory than prior art implementations for noise energy estimation.

This also adds more flexibility to the respective receiver devices and enables new and improved receiver algorithms to be implemented.

Additionally, in those receivers, needed calculation results are immediately available, and only minor modifications to existing receivers are necessary.

Moreover, the present invention can be implemented in any receiver device adapted to operate according to the TDMA transmission principle, and can thus be used in all base stations conforming to GSM specification.

In addition, the method and device for variance estimation as proposed in this application, can be used in combination with the method and device as proposed in applicants former (still unpublished) patent application PCT/EP 98/04562 dealing with channel impulse response estimation using received signal variance, filed on Jul. 21, 1998, for use in receiver devices, thereby improving receiver sensitivity.

Preferred embodiments of the present invention are now described herein below in detail by way of example with reference to the accompanying drawings.

DESCRIPTION OF PREFERRED EMBODIMENTS

Figure 1:
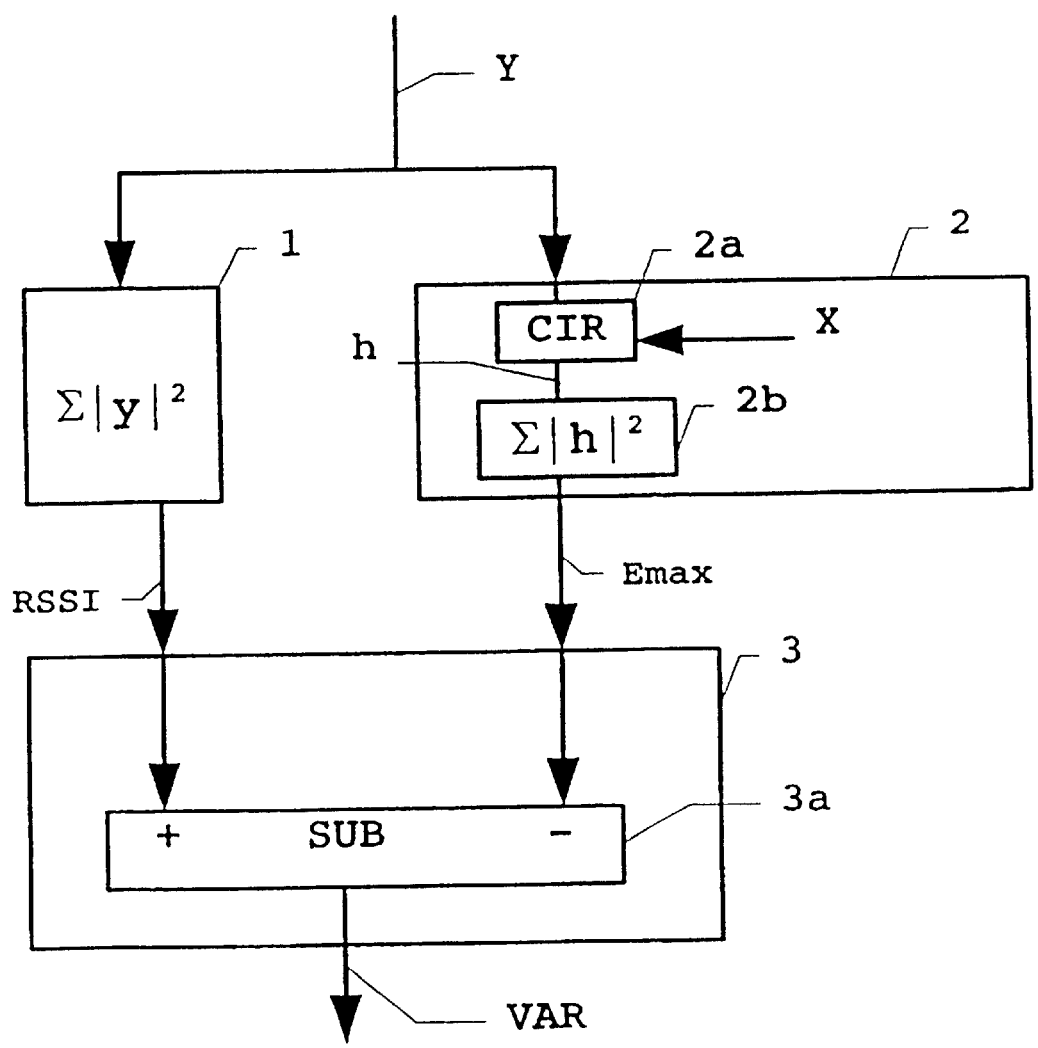
FIG. 1 illustrates a schematic block circuit diagram of a basic implementation of a device according to the present invention.

According to the present invention, the noise energy and/or variance of a received signal is no longer calculated as the difference between the received signal and the result of a convolution processing of a training sequence and estimated impulse response of the transmission channel, as it is performed in the know prior art.

Instead, the present invention is based on the idea that the received signal is the original signal plus a noise component. Hence, the noise component is the received signal minus the original signal. Moreover, the noise energy represents the variance of the received signal. The variance is thus estimated based on the energy of the received signal and the energy of impulse response taps. More specifically, according to the present invention, the variance is estimated as the difference between the energy of the received signal and the energy of the impulse response taps, as will be subsequently explained in terms of both, the method and device according to the present invention.

It should be noted that in the present description "energies" are average energies of a respective signal and are thus to be divided by a length of signal symbol sequences in order to obtain an average energy of a signal per symbol. The length of a symbol sequence is represented by a number N of symbols contained in the sequence. Also, an expression of "energy of signal" is intended to mean an energy of a signal per symbol.

Generally, a received signal y also contains a training sequence X. The training sequence is known beforehand to the system and is also transmitted as a part of the data transmitted during a time slot of a TDMA frame as a so-called data burst.

In the following, particular attention is firstly paid to the description of the principles underlying the method according to the present invention.

To this end, the received signal is assumed to be expressed by the following formula:

$$Y = Xh + w \qquad (1)$$

where Y denotes the received signal transmitted via the transmission channel, X represents the training sequence, h denotes an estimated channel impulse responses and w denotes the noise contained in the received signal. It should be noted that bold letters in this and following formulas indicate that the respective quantity/variable is in vector and/or matrix representation.

If the above equation (1) is transformed such that both sides of the formula are expressed as the respective energy E, this reads as follows:

$$E(Y^H Y) = E((Xh+w)^H (Xh+x)) \qquad (2)$$

Under the assumption, that the data, i.e. the received signal Y and the noise w are uncorrelated, the right side of equation (2) can be rewritten as follows:

$$E(Y^H Y) = E(h^H X^H X h) + E(w^H w) \qquad (3)$$

Apparently, in equation (3) the term $E(w^H w)$ represents the energy of noise, while the term $E(h^H X^H X h)$ represents the energy of the signal, and $E(Y^H Y)$ represents the energy of the received signal.

Now, an approximation can be made to the end that $(X^H X)$, i.e. the product of the conjugate complex transposition of the training sequence matrix $X^H$ and the training sequence matrix X (in complex notation), makes "1", or represents a unit matrix having only values of "1" in its diagonal. This depends on the properties or characteristics of the chosen training sequence.

Under this approximation, the energy symbol of the channel impulse response taps can be rewritten to read $$E(h^H X^H X h)/N = E(h^H h)/N = \left(\sum_i (\text{Re}\{h_i\}^2 + \text{Im}\{h_i\}^2)\right)/N \quad (4)$$

$$= E\max$$

with

Re{$h_i$} denoting the real component of the i-th vector component of the channel impulse response h in vector representation, Im{$h_i$} denoting the imaginary component of the i-th vector component of the channel impulse response h in vector representation, h denotes the vector of the channel impulse response, $h^H$ denotes the conjugate complex transposition of the vector of the channel impulse response, and X represents a training sequence in vector representation, the training sequence being such that the product of the training sequence with its conjugate complex transposition $X^H$ makes "1", and N representing the length of the sequence Y in equation (3) above.

Similarly, the energy E of the received signal/symbol Y can be expressed as $$E(y^H y)/N = \left(\sum_i (\text{Re}\{y_i\}^2 + \text{Im}\{y_i\}^2)\right)/N = RSSI \quad (5)$$

with

Re{$y_i$} denoting the real component of the i-th vector component of the received signal y in vector representation, Im{$y_i$} denoting the imaginary component of the i-th vector component of the received signal y in vector representation, y denotes the vector of the received signal, and $y^H$ denotes the conjugate complex transposition of the vector of the received signal, and RSSI stands for Received Signal Strength Indicator, and N representing the length of the sequence Y in equation (3) above.

In consideration of the above, the noise energy or variance VAR is then obtained as the difference between the energy of the received signal/symbol RSSI and the energy of the signal/symbol approximately represented by the energy of the impulse response taps of the channel impulse response h VAR=RSSI−Emax (6)

The above equation (6) is a result of the approximations made when deducing the said equation. Nevertheless, this relation provides sufficiently reliable results in almost all cases.

However, a modification of formula (6) can be obtained as follows. Particularly, the energy of the impulse response taps is weighted by a first and a second predetermined factor (weighting factor) a and b, respectively.

Then, a thus modified equation (6) reads

VAR=RSSI−a*Emax (7)

and

ACT_VAR=MAX(VAR, b*Emax) (8)

with ACT_VAR denoting the actual variance to be used in the receiver as a result of the (modified) method according to the present invention being implemented. Specifically, as the actual variance, the maximum value of the variance VAR obtained according to equation (7) and the energy Emax of the impulse response taps weighted with the second predetermined factor b is selected.

The predetermined factors a, b are user specific constants, respectively. It should be noted that upon selection of the weighting factors a, b to equal 1, 0, respectively, the modified method is reduced to the above explained basic method.

The setting of these components is dependent on the environment where the receiver is to be used and may also depend on the characteristics of an equipment used (e.g. thermal noise characteristics of the equipment).

Experiments conducted by the present inventors show, that suitable values for a and b may be a=0.5 and b=1/32. With the value b, a minimum possible value of the variance VAR is set. Namely, with reference to equation (8), if the value VAR (of equation (7)) is below b*VAR, then b*VAR is the bigger value and selected as ACT_VAR because it is the maximum of both values. By limiting VAR or ACT_VAR to a minimum, a quotient of Emax/VAR (or Emax/ACT_VAR, respectively), is limited to a maximum possible value. From this quotient, in turn, a value of S/N can be derived.

Thus, according to the method according to the present invention, the signal variance of the received signal is estimated in an estimation step adapted to implement the functional relationship according to equation (6). Prior to performing this step, an estimation step of estimating the energy/symbol of the received signal RSSI is performed and an estimation step of estimating the energy/symbol of the channel impulse response taps Emax is performed. These steps are advantageously adapted to implement functional relationships according to equations (5) and (4), respectively.

According to the above discussed modification, the actual signal variance ACT_VAR of the received signal is estimated in an accordingly modified estimation step which is adapted to implement the functional relationship according to equations (7) and (8).

Subsequently, the corresponding device according to the present invention will be explained in detail with reference to the drawing.

FIG. 1 shows a schematic block circuit diagram of a basic implementation of a device according to the present invention.

As illustrated therein, a received signal y transmitted via a transmission path (not shown) is supplied to the device which device forms part of a receiver apparatus.

The received signal y is branched and supplied to a first estimation means 1 and a second estimation means 2, respectively.

The first estimation means is adapted to estimate the energy/symbol of the received signal y, also denoted as RSSI (Received Signal Strength Indicator). This energy can be expressed as $\Sigma|Y|^2$ as the received signal being assumed to be represented as a signal in complex notation). Particularly, the first estimation means 1 is adapted to perform as processing in terms of input/output characteristics as expressed in the above equation (5).

The second estimation means is adapted to estimate the energy/symbol Emax of taps of the channel impulse response h. To this end, the second estimation means 2 comprises a channel impulse response (CIR) estimation unit 2a and a processing unit 2b.

The CIR estimation unit 2a derives the channel impulse response on the basis of the supplied received signal Y and an input training sequence X, which is contained within the data of the received signal, and also known to the device. The known training sequence is input to the CIR estimation unit 2a, for example from a memory unit (not shown) storing respective training sequences.

The design of the channel impulse response estimation unit 2a as such is not critical to the present invention and can be a conventionally known unit, so that a detailed description thereof is omitted here.

As a result of the processing performed by the CIR estimation unit 2a, a signal h representing the channel impulse response function and/or the channel impulse response taps is output and supplied to the further processing unit 2b which is adapted to output the energy/symbol Emax of the channel impulse response taps based on the results of the preprocessing of the unit 2a. The energy/symbol Emax can be expressed as $\Sigma |h^2|$. Particularly, the further processing unit is adapted to perform a processing in terms of input/output characteristics as expressed in the above equation (4). It should always be kept in mind that the indicated signals are vector signals composed of i vector components each, with i being dependent on the FIR channel model expressed by the channel impulse response function h.

The output signals RSSI and Emax provided by the first and second estimation means, respectively, are forwarded to a third estimation means 3.

The third estimation means 3 is adapted to derive the signal variance or noise energy on the basis of these two signals supplied thereto. More precisely, the signals RSSI and Emax are respectively supplied to a positive (+) and a negative (−) input terminal of a subtracting unit 3a of said third estimation means 3.

The subtracting unit 3a (and/or the third estimation means 3) in the illustrated basic implementation of a device according to the present invention are adapted to perform a processing in terms of input/output characteristics as expressed in the above equation (6). Subsequently, a signal VAR as the signal variance or noise energy is output and thus provided for further use in the receiver device.

Figure 2:
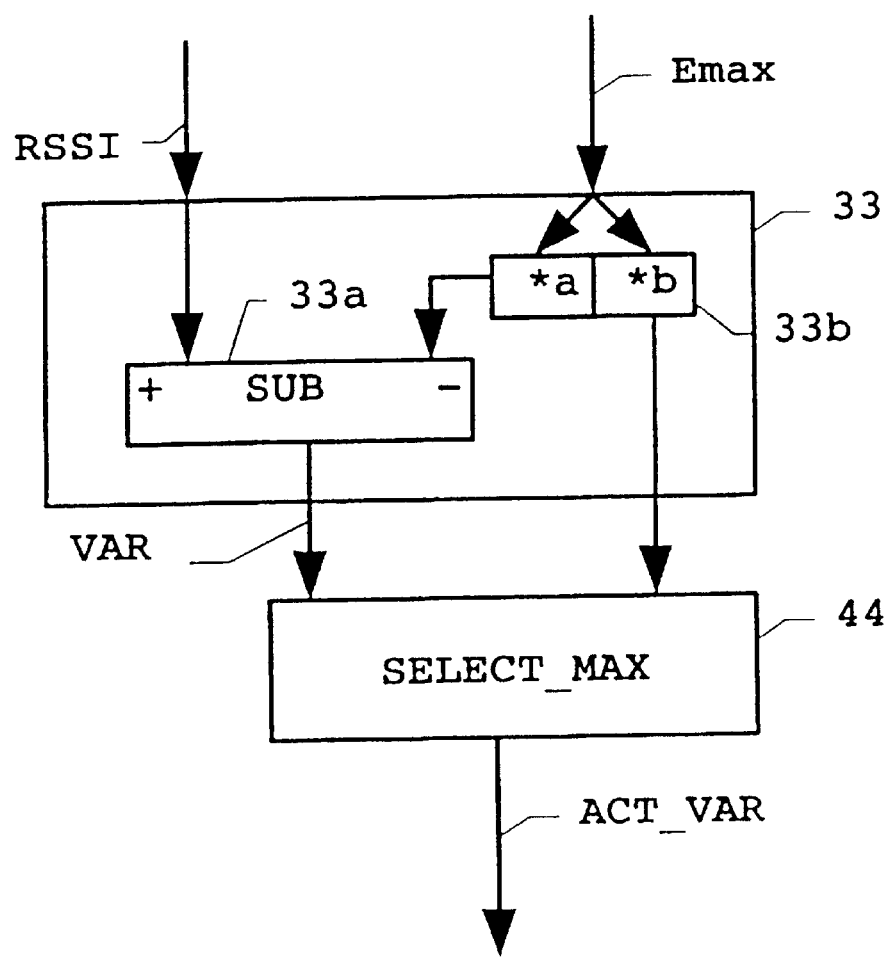
FIG. 2 shows a modification of the basic implementation shown in FIG. 1.

Now, with reference to FIG. 2, a modification of the basic implementation as shown in FIG. 1 is described.

Since the modification relates only to the third estimation means, a repeated description of the first and second estimation means is considered to be dispensable.

As illustrated in FIG. 2, the modified third estimation means 33 comprises a subtracting unit 33a and additionally comprises a weighting unit 33b. The weighting unit performs a weighting, i.e. a multiplication of the supplied signal Emax with predetermined factors a, b, respectively. An output a*Emax of the weighting unit 33b is supplied to the negative (−) terminal of the subtracting unit, while the signal RSSI is still supplied to its other, i.e. positive (+) terminal. The subtracting unit is thus adapted to provide as its output signal a signal VAR as expressed by the above equation (7). This signal VAR is output as one of two input signals to an additionally provided selecting means 44 of the device. As the second of two input signals supplied to said selecting means 44, there is supplied an output b*Emax of the weighting unit 33b of the modified third estimation means 33.

The selecting means 44 is adapted to output the signal having the larger value of the two input signals as an actual variance ACT_VAR to be used further in the receiver.

The predetermined weighting factors a, b, respectively, can be set by means of a setting means (not shown) as user specific constants. Particularly in case of setting these factors to a=1 and b=0, the structure of the modified third estimation means is reduced to the above explained basic structure of the third estimation means. As mentioned above, the specific setting of these components is dependent on the environment where the receiver is to be used and may also depend on the characteristics of an equipment used (e.g. thermal noise characteristics of the equipment). Experiments conducted by the present inventors show, that suitable values for a and b may be a=0.5 and b=⅟32. With the value b, a minimum possible value of the variance VAR is set. Namely, with reference to equation (8), if the value VAR (of equation (7)) is below b*VAR, then b*VAR is the bigger value and selected as ACT_VAR because it is the maximum of both values. By limiting VAR or ACT_VAR to a minimum, a quotient of Emax/VAR (or Emax/ACT_VAR, respectively), is limited to a maximum possible value. From this quotient, in turn, a value of S/N can be derived.

Accordingly, as has been described herein above, the present invention proposes a method for estimating a signal variance of a received signal y transmitted via a transmission channel, said method comprising the steps of: estimating the energy RSSI of the received signal y, estimating the energy Emax of channel impulse response h taps, and estimating said signal variance VAR of said received signal by subtracting said estimated energy of channel impulse response taps Emax from said estimated energy RSSI of said received signal, such that said signal variance is obtained as VAR= RSSI−Emax, as well as a correspondingly adapted device.

It should be understood that the above description and accompanying figures are merely intended to illustrate the present invention by way of example only. The preferred embodiments of the present invention may thus vary within the scope of the attached claims.

What is claimed is:

1. A method for estimating a signal variance (VAR) received signal transmitted via a transmission channel, said method comprising the steps of:

estimating an energy (RSSI) of the received signal, estimating an energy of (Emax) of channel impulse response taps, wherein estimating said signal variance of said received signal by subtracting the estimated energy of channel impulse response taps from the estimated energy of said received signal, such that said signal variance is obtained as:

$VAR = RSSI - Emax,$ wherein said estimated energy of the received signal is represented by a sum of all vector components of the received signal according to a relation of $$RSSI = \left(\sum_i (\text{Re}\{y_i\}^2 + \text{Im}\{y_i\}^2)\right) \bigg/ N = E(y^H y)/N$$

with

Re$\{y_i\}$ denoting a real component of the i-th vector component of the received signal y in vector representation, Im$\{y_i\}$ denoting an imaginary component of the i-th vector component of the received signal y in vector representation, y denotes the vector of the received signal, and $y^H$ denotes a conjugate complex transposition of the vector of the received signal, and wherein
said estimated energy of said channel impulse response taps is represented by a sum of all vector components of the channel impulse response according to a relation of $$Emax = \left(\sum_i (\text{Re}\{h_i\}^2 + \text{Im}\{h_i\}^2)\right)\bigg/ N = E(h^H X^H hX)/N$$

with
Re{$h_i$} denoting a real component of the i-th vector component of the channel impulse response h in vector representation,
Im{$h_i$} denoting an imaginary component of the i-th vector component of the channel impulse response h in vector representation,
h denotes the vector of the channel impulse response,
$h^H$ denotes a conjugate complex transposition of the vector of the channel impulse response, and
X represents a training sequence in vector representation, the training sequence being such that a product of the training sequence with its conjugate complex transposition $X^H$ makes "1" and
wherein N (N is a natural number) represents the length of a symbol sequence of the received signal y.

2. A method according to claim 1, wherein
said step of estimating said signal variance of said received signal further comprises
a step of weighting said estimated energy of channel impulse response taps by a respective first and second predetermined factor, and wherein
the estimated signal variance is obtained by subtracting said estimated energy of channel impulse response taps weighted with the first predetermined factor, a, from
said estimated energy of said received signal,
such that said signal variance is obtained as: VAR=RSSI−a*Emax, and said method further comprises a selecting step for selecting an actual estimated variance (PCT-VAR) as the maximum value of said estimated signal variance and said estimated energy of channel impulse response taps weighted with the second predetermined factor, b, such that the actual estimated variance is obtained as:

$ACT_{13}VAR=MAX(VAR, b*Emax)$.

3. A method according to claim 2, wherein the first and second predetermined factors are user specific constants.

4. A device for estimating a signal variance (VAR) of a received signal transmitted via a transmission channel, said device comprising:
first estimation means adapted to estimate an energy (RSSI) of the received signal,
second estimation means adapted to estimate an energy (Emax) of channel impulse response taps, and
third estimation means adapted to estimate said signal variance of said received signal and comprising a subtracting unit adapted for subtracting
the estimated energy of channel impulse response taps from
the estimated energy of said received signal, such that said signal variance is obtained as:

$VAR=RSSI-Emax$ wherein
said estimated energy of the received signal is represented by a sum of all vector components of the received signal according to a relation of $$RSSI = \left(\sum_i (\text{Re}\{y_i\}^2 + \text{Im}\{y_i\}^2)\right)\bigg/ N = E(y^H y)/N$$

with
Re{$y_i$} denoting a real component of the i-th vector component of the received signal y in vector representation,
Im{$y_i$} denoting an imaginary component of the i-th vector component of the received signal y in vector representation,
y denotes the vector of the received signal, and $y^H$ denotes a conjugate complex transposition of the vector of the received signal, and wherein
said estimated energy of said channel impulse response taps is represented by a sum of all vector components of the channel impulse response according to a relation of $$Emax = \left(\sum_i (\text{Re}\{h_i\}^2 + \text{Im}\{h_i\}^2)\right)\bigg/ N = E(h^H X^H hX)/N$$

with
Re{$h_i$} denoting a real component of the i-th vector component of the channel impulse response h in vector representation,
Im{$h_i$} denoting an imaginary component of the i-th vector component of the channel impulse response in vector representation,
h denotes the vector of the channel impulse response,
$h^H$ denotes a conjugate complex transposition of the vector of the channel impulse response, and
X represents a training sequence in vector representation, the training sequence being such that a product of the training sequence with its conjugate complex transposition $X^H$ makes "1," and
wherein N (N is a natural number) represents the length of a sequence of the received signal y.

5. A device according to claim 4, wherein
said third estimation means adapted to estimate said signal variance of said received signal further comprises
a weighting unit adapted to weight said estimated energy of channel impulse response taps by a respective first and second predetermined factor, and
said subtracting unit outputs the estimated signal variance as a result of subtracting
said estimated energy of channel impulse response taps weighted with the first predetermined factor, a, from
said estimated energy of said received signal, such that said signal variance is obtained as $VAR=RSSI-a*Emax,$ and said device further comprises
a selecting means adapted to select an actual estimated variance (ACT_VAR) as the maximum value of said estimated signal variance and said estimated energy of b, channel impulse response taps weighted with the second predetermined factor, b, such that the actual estimated variance is obtained as $$ACT\_VAR = MAX(VAR, b*Emax).$$

6. A device according to claim 5, wherein the first an second predetermined factors are user specific constants.

* * * * *